(12) United States Patent
Liu et al.

(10) Patent No.: US 10,922,452 B2
(45) Date of Patent: Feb. 16, 2021

(54) DIGITAL SIMULATION SYSTEM OF POWER DISTRIBUTION NETWORK

(71) Applicants: CHINA ELECTRIC POWER RESEARCH INSTITUTE COMPANY LIMITED, Beijing (CN); STATE GRID CORPORATION OF CHINA, Beijing (CN)

(72) Inventors: Keyan Liu, Beijing (CN); Wanxing Sheng, Beijing (CN); Yinglong Diao, Beijing (CN); Jiangang Tang, Beijing (CN); Xueshun Ye, Beijing (CN); Kaiyuan He, Beijing (CN); Dongli Jia, Beijing (CN); Lijuan Hu, Beijing (CN)

(73) Assignees: CHINA ELECTRIC POWER RESEARCH INSTITUTE COMPANY LIMITED, Beijing (CN); STATE GRID CORPORATION OF CHINA, Beijing (CN)

( * ) Notice: Subject to any disclaimer, the term of this patent is extended or adjusted under 35 U.S.C. 154(b) by 378 days.

(21) Appl. No.: 15/757,401

(22) PCT Filed: Jun. 30, 2016

(86) PCT No.: PCT/CN2016/087819
§ 371 (c)(1),
(2) Date: Mar. 5, 2018

(87) PCT Pub. No.: WO2017/036244
PCT Pub. Date: Mar. 9, 2017

(65) Prior Publication Data
US 2018/0247001 A1   Aug. 30, 2018

(30) Foreign Application Priority Data
Sep. 6, 2015 (CN) .......................... 2015 1 0561160

(51) Int. Cl.
*G06F 30/20* (2020.01)
*G06F 16/955* (2019.01)
(Continued)

(52) U.S. Cl.
CPC ............ *G06F 30/20* (2020.01); *G06F 16/955* (2019.01); *G06F 30/367* (2020.01);
(Continued)

(58) Field of Classification Search
CPC .. H02J 3/00; G06F 30/23; G06F 9/505; G06F 9/465; G06F 9/4488; G06F 40/274;
(Continued)

(56) References Cited

U.S. PATENT DOCUMENTS

| 6,078,918 A * | 6/2000 | Allen ..................... G06F 40/274 |
| 6,377,975 B1 * | 4/2002 | Florman ................. G06F 9/505 |
| | | 709/203 |

(Continued)

FOREIGN PATENT DOCUMENTS

| CN | 201298233 Y | 8/2009 |
| CN | 103248127 A | 8/2013 |

(Continued)

OTHER PUBLICATIONS

Montreuil et al., "An Open Logistics Interconnection model for the Physical Internet" IFAC Symposium, 2012.*

(Continued)

*Primary Examiner* — Kandasamy Thangavelu
(74) *Attorney, Agent, or Firm* — Arent Fox LLP; Michael Fainberg

(57) ABSTRACT

A digital simulation system of a power distribution network, comprising: a client and a server end. The server end is a simulation server cluster composed of several simulation servers; the simulation server cluster and the client are mutually connected through a communication bus, wherein
(Continued)

the client is configured to use a DCOM component to invoke a simulation service provided by the server end, and the server end is configured to distribute a task to be processed to each cluster node. Constructing the above-mentioned digital simulation system facilitates an optimal planning and operation of a smart power distribution network, thereby improving the utilization efficiency and reliability of the smart power distribution network and reducing the loss of a power outage.

7 Claims, 5 Drawing Sheets

(51) Int. Cl.
  *G06F 30/367* (2020.01)
  *G06F 119/06* (2020.01)
(52) U.S. Cl.
  CPC .......... *G06F 2119/06* (2020.01); *Y02D 10/00* (2018.01); *Y02E 40/70* (2013.01); *Y02E 60/00* (2013.01); *Y04S 10/50* (2013.01); *Y04S 40/20* (2013.01)
(58) Field of Classification Search
  CPC .... G06F 16/2228; G06F 30/20; G06F 30/367; G06F 16/955; G06F 2119/06; G05B 17/02; H04L 29/06; H04L 63/1433; H04L 61/103; H04L 63/0281; H04L 67/1002; H04N 21/2541; G06Q 30/0276; G06Q 10/06; Y02D 10/00; Y02E 40/70; Y02E 60/00; Y04S 10/50; Y04S 40/20
  See application file for complete search history.

(56) References Cited

U.S. PATENT DOCUMENTS

| | | | | |
|---|---|---|---|---|
| 6,553,402 | B1 | 4/2003 | Makarios | |
| 7,542,885 | B1* | 6/2009 | Majumdar | G06F 30/23 |
| | | | | 703/2 |
| 7,761,885 | B2* | 7/2010 | Labrou | G06F 9/465 |
| | | | | 715/700 |
| 8,046,250 | B1* | 10/2011 | Cohen | G06Q 10/06 |
| | | | | 705/7.13 |
| 9,099,866 | B2 | 8/2015 | Seaman | |
| 2002/0087729 | A1* | 7/2002 | Edgar | H04L 29/06 |
| | | | | 709/246 |
| 2003/0145094 | A1* | 7/2003 | Staamann | H04L 63/0281 |
| | | | | 709/229 |
| 2005/0015775 | A1* | 1/2005 | Russell | G06F 9/4488 |
| | | | | 719/315 |
| 2006/0156032 | A1* | 7/2006 | Panjwani | H04L 63/1433 |
| | | | | 713/191 |
| 2008/0077368 | A1* | 3/2008 | Nasle | G05B 17/02 |
| | | | | 703/4 |
| 2009/0094176 | A1* | 4/2009 | Williams | H04L 67/1002 |
| | | | | 706/12 |
| 2011/0213606 | A1 | 9/2011 | Seaman | |
| 2011/0265150 | A1* | 10/2011 | Spooner | H04N 21/2541 |
| | | | | 726/4 |
| 2012/0022713 | A1* | 1/2012 | Deaver, Sr. | G05B 17/02 |
| | | | | 700/298 |
| 2013/0253898 | A1* | 9/2013 | Meagher | H02J 3/00 |
| | | | | 703/18 |
| 2014/0143068 | A1* | 5/2014 | Simonian | G06Q 30/0276 |
| | | | | 705/14.72 |
| 2014/0188840 | A1* | 7/2014 | Agarwal | G06F 16/2228 |
| | | | | 707/711 |
| 2015/0149143 | A1 | 5/2015 | Romaniuk | |
| 2015/0195137 | A1* | 7/2015 | Kashyap | H04L 61/103 |
| | | | | 370/254 |

FOREIGN PATENT DOCUMENTS

| | | |
|---|---|---|
| CN | 103873321 A | 6/2014 |
| CN | 103914789 A | 7/2014 |
| CN | 104123675 A | 10/2014 |
| CN | 104124756 A | 10/2014 |
| CN | 104462688 A | 3/2015 |
| CN | 105205231 A | 12/2015 |

OTHER PUBLICATIONS

International Search Report in international application No. PCT/CN2016/087819, dated Oct. 9, 2016.
English Translation of the Written Opinion of the International Search Authority in international application No. PCT/CN2016/087819, dated Oct. 9, 2016.

\* cited by examiner

DIGITAL SIMULATION SYSTEM OF POWER DISTRIBUTION NETWORK

CROSS-REFERENCE TO RELATED APPLICATIONS

This application is the U.S. National Stage Application of International Patent Application No. PCT/CN2016/087819, filed on Jun. 30, 2016, which claims priority to Chinese Patent Application No. 201510561160.8, filed on Sep. 6, 2015, the contents of each of which is incorporated herein by reference in its entirety.

TECHNICAL FIELD

The disclosure relates to a simulation technology for a power distribution network in the field of electrics, and particularly, to a Distributed Component Object Model (DCOM)-based digital simulation system for a power distribution network.

BACKGROUND

A power distribution network is a network located at a tail end of a power system and mainly having an electric energy distribution function in a power grid. A power distribution network has distinct characteristics of wide regional distribution, large power grid scale, various types of equipment, diversified network connections, various operation manners and the like. The power distribution network is large and complex in structure. The network structure frequently changes due to failures or switching-on/off of switches during load transfer operations. With urbanization and increase of electricity demands, the power distribution network is kept transformed and extended all the time, scale of the power distribution network is also continuously expanded. Meanwhile, massive access of various types of distributed power supplies and continuous improvement of an automation degree make control and analysis over the power distribution network increasingly complex.

In order to keep a power distribution network in a safe, reliable, high-quality, economical and efficient optimal operation state, improve electric energy quality of a power distribution system and maximally increase economic benefits of a power grid enterprise to further improve a management level and working efficiency of the whole power distribution system, power distribution network simulation has become an important job penetrating through research, planning and operation of the power distribution system. Only deep simulation analysis over the power distribution network may ensure more accurate prediction and more scientific decision-making of power distribution network planning and scheduling personnel.

At present, there are fewer digital simulation system for a power distribution networks, simulation remains more on aspects of theoretical analysis and training simulation, has no function of guiding safe production and economical operation of the power distribution network, or is not deeply coupled to systems of power distribution automation, planning development and the like as an advanced application, is undiversified in function, and may not comprehensively cover the whole power distribution network simulation system, fewer models are supported, an algorithm is low in efficiency, a calculation result is inaccurate, and may not reflect a practical field state, it is difficult to deal with a large-scale, complex and changeable power distribution network, and quite negative influence is brought to development of a modern power distribution network.

Therefore, there is yet no effective solution for designing and implementing a power distribution network simulation system to improve a research, design and planning level of a power distribution network and ensure safe and stable operation of the power distribution network.

SUMMARY

In order to solve the problem, the disclosure provides a DCOM-based digital simulation system for a power distribution network, which, by analysis and calculation of an intelligent digital simulation platform for a power distribution network, may effectively reduce power outage time of a line of a non-failure section during a failure of a power grid, improve the whole power supply reliability level of the power grid and avoid huge economic loss caused by power outage in important industries of the high and new technology industry, commercial finance and the like.

The technical solution of an embodiment of the disclosure is implemented as follows.

According to an aspect of the disclosure, a digital simulation system for a power distribution network is provided, which includes: clients and a server, wherein the server is a simulation server cluster formed by simulation servers; the clients are connected with the simulation server cluster through a communication bus; and the server is configured to: operate information offline within a unit time, estimate a state of the power distribution network, simulate an operation state of the unit time off line, acquire each of operation indexes, including a power flow distribution, a voltage, reactive power and line loss, operate the information in real time within the unit time, estimate the state of the power distribution network, simulate the operation state of the unit time on line, acquire each of operation indexes, calculate a short-circuit current of the power distribution network, calculate a reliability level, trend simulation, contingency simulation and reliability simulation of the power distribution network according to a structure and equipment information of the power distribution network, acquire failure reliability, a system average power outage frequency and a power outage duration, calculate a capacitor capacity and position of a reactive power compensation device, provide a wiring solution meeting loads of the power distribution network, and implement unified maintenance of graphic data and attribute data.

Preferably, the clients are configured to use a DCOM component to call simulation service provided by the server; and the server is further configured to distribute to-be-processed tasks to each node of the simulation server cluster.

Preferably, the server includes a data layer, an encapsulation layer and a service layer, wherein the data layer is configured to extract simulation data from a simulation database and an external data source;

the encapsulation layer is configured to encapsulate a simulation module of the service layer into a service; and the service layer is configured to provide unified calling of the simulation service of the encapsulation layer for the clients.

Preferably, the simulation server cluster is connected with the simulation database and the external data source through double data buses respectively.

Preferably, the encapsulation layer includes:

a topological module, configured to load the simulation data into a shared memory of the simulation server cluster;

a memory calculation module, configured to call the DCOM component of a memory database for memory calculation;

an interface module, configured to transmit Extensible Markup Language (XML)-format data;

a communication parsing module, configured to parse XML files sent by the clients; and a data filtering module, configured to screen received data to filter an illegal request through an open simulation interface.

Preferably, the service layer includes the simulation module;

the simulation module includes:

an offline operation simulation unit, configured to operate the information off line within the unit time, estimate the state of the power distribution network, simulate the operation state of the unit time off line, and acquire each of operation indexes, including the power flow distribution, the voltage, the reactive power and the line loss;

an online operation simulation unit, configured to operate the information in real time within the unit time, estimate the state of the power distribution network, simulate the operation state of the unit time on line, and acquire each of operation indexes;

a failure simulation unit, configured to calculate the short-circuit current of the power distribution network;

a reliability simulation unit, configured to calculate the reliability level, trend simulation, contingency simulation and N-K reliability simulation of the power distribution network according to the structure and equipment information of the power distribution network, and acquire the failure reliability, the system average power outage frequency and the power outage duration;

an optimization simulation unit, including a reactive power optimization simulation subunit and a locating and sizing simulation subunit, the reactive power optimization simulation subunit being configured to calculate the capacitor capacity and position of the reactive power compensation device and the locating and sizing simulation subunit being configured to provide the wiring solution meeting the loads of the power distribution network; and a graphic model library maintenance unit, configured to implement unified maintenance of the graphic data and the attribute data.

Preferably, that the service layer provides unified calling of the simulation service of the encapsulation layer for the clients is implemented in the following manner:

a coordination server is selected from the distributed cluster, and is configured to give responses to access requests of the clients, maintain a to-be-processed task queue $A=\{a_1, a_2, a_3 \ldots\}$ and allocate simulation tasks by adopting a dynamic polling method;

a target network in the task queue of the database is read for unified topology and sharing to each simulation server; meanwhile, the coordination server is used to continuously monitor and continuously update each server; each simulation server is analyzed in real time to allocate the simulation tasks into the cluster;

when a total number of network nodes for a certain task exceeds a threshold value, the simulation task in a complex network scale and involving multiple nodes is divided and distributed to idle simulation servers, meanwhile, a coordinated communication process is maintained, and an intermediate value of the nodes is integrated to generate a simulation result;

when a total number of network nodes for a certain task does not exceed a threshold value simulation calculation is ended, and the simulation result is returned.

Preferably, the service layer is further configured to allocate the simulation tasks by adopting the dynamic polling method in the following manner:

N simulation nodes are polled, real-time performance and current task load of each node are acquired, and current task load time is estimated to be $t_i$ (i<N), N being an integer greater than or equal to 1; and the estimated current task time $T=\{t_1, t_2, t_3 \ldots\}$ and performance coefficients $\{\partial=\partial_1, \partial_2, \partial_3 \ldots\}$ of all the nodes are calculated, and a to-be-allocated task node set $Re=f_{min}(T\times\partial, m)$ is acquired, where $f_{min}(S, m)$ represent m values, which are lower than all other values, of a set S; and m tasks are allocated according to the set Re, and the to-be-processed task queue is updated.

The embodiment of the disclosure at least has the following beneficial effects.

(1) A distributed deployment manner for the power distribution network simulation system is provided, and includes implementation of parallel calculation for simulation requests for different functions of multiple users and implementation of distributed calculation by longitudinal task division over a large network, task loads are balanced, topological data of the network is shared, and an overall calculation throughput and calculation efficiency of the simulation system are improved.

(2) A service-oriented power distribution network simulation calculation framework is provided, and a unified open simulation interface and protocol are utilized to implement transparent calling of the simulation clients, so that loose coupling between each simulation function is implemented, and high extensibility and flexibility are achieved.

(3) A large-scale complex power distribution network-based simulation function system is proposed, and The digital simulation system for the power distribution network is developed and implemented to comprehensively cover various simulation requirements in a research, planning and operation process of the power distribution network.

(4) By analysis calculation of an intelligent power distribution network digital simulation platform, power outage time of a line of a non-failure section during a failure of a power grid may be effectively reduced, the whole power supply reliability level of the power grid may be improved, huge economic loss caused by power outage in important industries of the high and new technology industry, commercial finance and the like may be avoided, and remarkable economic and social benefits are achieved.

DETAILED DESCRIPTION

Figure 1:
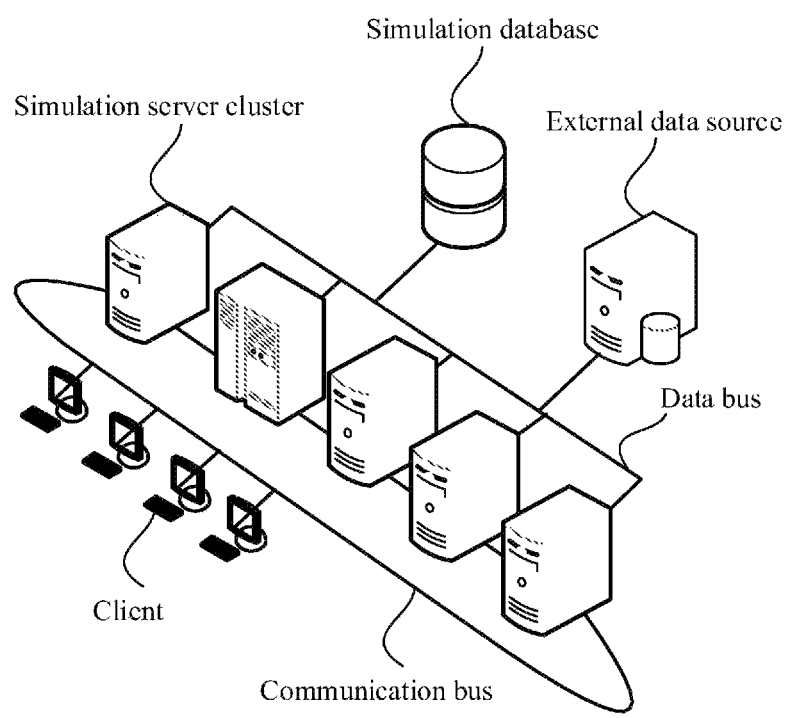
FIG. 1 is a schematic diagram of a distributed deployment manner for a digital simulation system for a power distribution network according to the disclosure.
Figure 2:
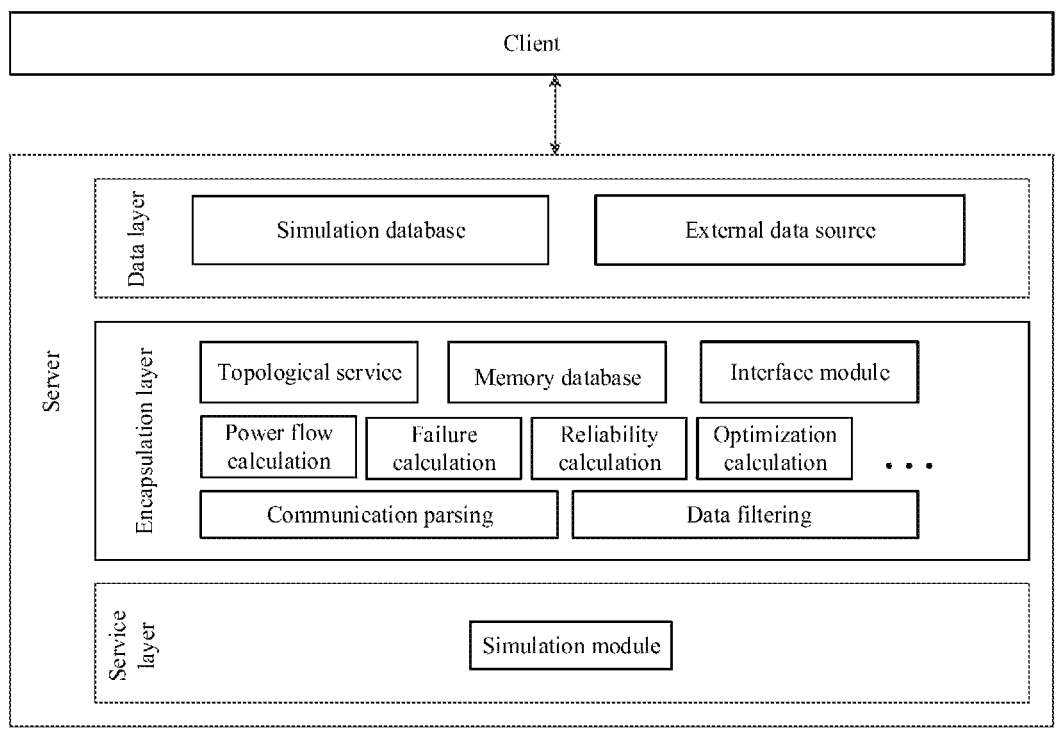
FIG. 2 is an architecture diagram of a server of a digital simulation system for a power distribution network.

As shown in FIG. 1 and FIG. 2, an embodiment of the disclosure provides a DCOM-based digital simulation system for a power distribution network. For simulation requirements of work of research, planning, operation and the like over a power distribution network and in consideration of characteristics of various types of equipment, great regional differences, multiple data sources, severe shortage of measurement points, large network scale, difficulties in high-dimensional calculation, frequent updating of a network structure and the like of the power distribution network, a digital simulation function system comprehensively covering a current power distribution network is proposed to make it applicable to multiple departments of development, planning design, scheduling operation and maintenance and the like, thereby implementing simulation technologies of power distribution network operation simulation, failure simulation, reliability simulation, optimization simulation and the like. The system includes clients and server. The server is a simulation server cluster formed by a plurality of simulation servers. The simulation server cluster is connected with the clients through a communication bus.

The clients are configured to use a DCOM component to call simulation service provided by the server. The server is configured to distribute to-be-processed tasks to each node of the simulation server cluster. The distributed cluster deployment manner for the DCOM-based digital simulation system for a power distribution network may not only distribute calculation requests for different functions of multiple users to the simulation server cluster to improve a simulation throughput and improve flexibility and usability of the whole simulation server cluster, but also longitudinally divide the network distribution network to implement parallel simulation calculation for the problems of excessively high calculation dimension, excessively large calculated amount, lower solving efficiency and the like of a large-scale power grid.

As shown in FIG. 2, the server includes a data layer, an encapsulation layer and a service layer. The data layer is configured to provide basic data required by calculation for the encapsulation layer and extract simulation data from a simulation database and an external data source to implement heterogenous data integration and cleaning of the power distribution network. The encapsulation layer is configured to encapsulate a simulation module of the service layer into various types of simulation service.

The service layer is configured to provide unified calling of the simulation service of the encapsulation layer for the clients to implement program calling between different hosts (namely between the simulation server cluster and the clients) by virtue of a Transmission Control Protocol (TCP) and a bottom-layer Application Programming Interface (API) of an operating system.

The simulation server cluster is connected with the simulation database and the external data source through double data buses respectively.

The encapsulation layer includes topological service (module), a memory calculation module (not shown in FIG. 2), an interface module, communication parsing (module) and data filtering (module).

The topological service (module) is configured to load the simulation data of the simulation database into a shared memory of the simulation server cluster to avoid influence of repeated calling over the simulation database on calculation efficiency, a communication parsing program being responsible for parsing XML files sent by the clients and a data filtering function screening received data to abandon an illegal request on the basis of an open simulation interface.

The memory calculation module (not shown in FIG. 2) is configured to call the DCOM component of a memory database (database maintained in the memory) for memory calculation, a calculation method including power flow calculation, failure calculation, reliability calculation and optimization calculation, thereby increasing an operation speed of the memory database.

The interface module is configured to transmit XML-format data, to enable the clients of the simulation system to transparently call a simulation algorithm and also enable the sever of the simulation system to flexibly extend functions in a service manner.

The communication parsing (module) is configured to parse the XML files sent by the clients; and The data filtering (module) is configured to screen the received data (i.e. the XML files) to filter the illegal request through the open simulation interface.

The service layer includes the simulation module. The simulation module is defined by service loose coupling, and is independent from a hardware platform implementing the service, the operating system and a programming language, and the clients may transparently submit simulation requests and obtain results simply by adopting a predefined interface and protocol connection. Through the unified service layer of the server, the functions may be flexibly transversely/longitudinally extended to be adapted to continuously upgraded services.

The simulation module includes an offline operation simulation unit, an online operation simulation unit, a failure simulation unit, a reliability simulation unit, an optimization simulation unit and a graphic model library maintenance unit.

The offline operation simulation unit is configured to operate information (i.e. configuration data) off line within a unit time, estimate a state of the power distribution network, simulate an operation state of this time bucket (i.e. the unit time) off line, and acquire each of operation indexes, including a power flow distribution, a voltage, reactive power and line loss.

The online operation simulation unit is configured to operate the information in real time within the unit time, estimate the state of the power distribution network, simulate the operation state of this time bucket (i.e. the unit time) on line, and acquire each of operation indexes.

The offline operation simulation unit and the online operation simulation unit form power distribution network operation simulation, which is a most basic and most common algorithm for a power system during power flow calculation. A voltage amplitude and phase angle of each generatrix, active and reactive power of each load, line loss of the whole system and another operation index may be determined by power flow calculation according to an operation condition, network wiring and component parameter given by the system. A power distribution network operation simulation technology includes offline simulation and online simulation, and online simulation acquires real-time data from a data source such as a regional power distribution automation system and an electricity consumption information acquisition system, and analyzes the operation state of the whole power distribution network in real time.

The failure simulation unit is configured to calculate a short-circuit current of the power distribution network. Hazards brought by failures are researched and limited, and influence ranges of the failures are narrowed. The power distribution network is complex and changeable, and directly making a failure on a production site to acquire data may not only easily produce certain risks, but also require relatively higher related test cost, so that grounding tests are usually forbidden, which makes it difficult to obtain a large amount of original failure data, summarize common failure types and mine failure causes. Therefore, in the embodiment of the disclosure, a model is established for failure analysis by digital simulation. The digital simulation system for the power distribution network calculates the short-circuit current to simulate the whole process of occurrence of a failure and hazards brought by it to obtain related data to effectively guide operation and maintenance work.

Development and extension of a modern power distribution network system brings great economic benefits to a power system. However, it also causes complexification of a network structure and increase of failure rates of components in the power distribution network to bring enormous randomness and uncertainty problems to safe and normal operation of the power grid, which directly promotes research and development of a power distribution network reliability technology. The digital simulation system for the power distribution network quantitatively assesses a reliability level, including a historical reliability level of the system and a reliability level in a future time, of the system on the basis of reliability parameters of the components in the power distribution network and the system. Since access of a distributed power system greatly changes a structure and operation manner of the power distribution network, and own operation manner for distributed power supplies is greatly different from conventional components of the power distribution network, the digital simulation system considers a network structure of the power distribution network and failure/maintenance information of the power grid and the equipment after access of the distributed power supplies, calculates reliability levels and trends of the power distribution network in different operation environments and states, and provides indexes such as failure reliability, a system average power outage frequency and a power outage duration.

From the above, the reliability simulation unit is configured to extract equipment record data, network structure information of the power distribution network, electricity consumption acquisition information, load information and the like from a power distribution network data source including a power distribution network automation system, a Production Management System (PMS), an electricity consumption information acquisition system, a Geographic Information System (GIS) and the like according to a structure and equipment information of the power distribution network, calculate the reliability level, trend simulation, contingency simulation and N-K reliability simulation of the power distribution network, and acquire the failure reliability, the system average power outage frequency and the power outage duration.

The optimization simulation unit realizes a locating and sizing simulation function for the distributed power supplies, reactive power configuration simulation of a power distribution network including distributed power supplies, voltage reactive power optimization simulation and operation optimization simulation of a power distribution system including distributed power supplies in different operation environments and different operation states, and includes a reactive power optimization simulation subunit and a locating and sizing simulation subunit; the reactive power optimization simulation subunit is configured to calculate a capacitor capacity and position of a reactive power compensation device; and the locating and sizing simulation subunit is configured to provide a wiring solution meeting loads of the power distribution network.

Figure 3:
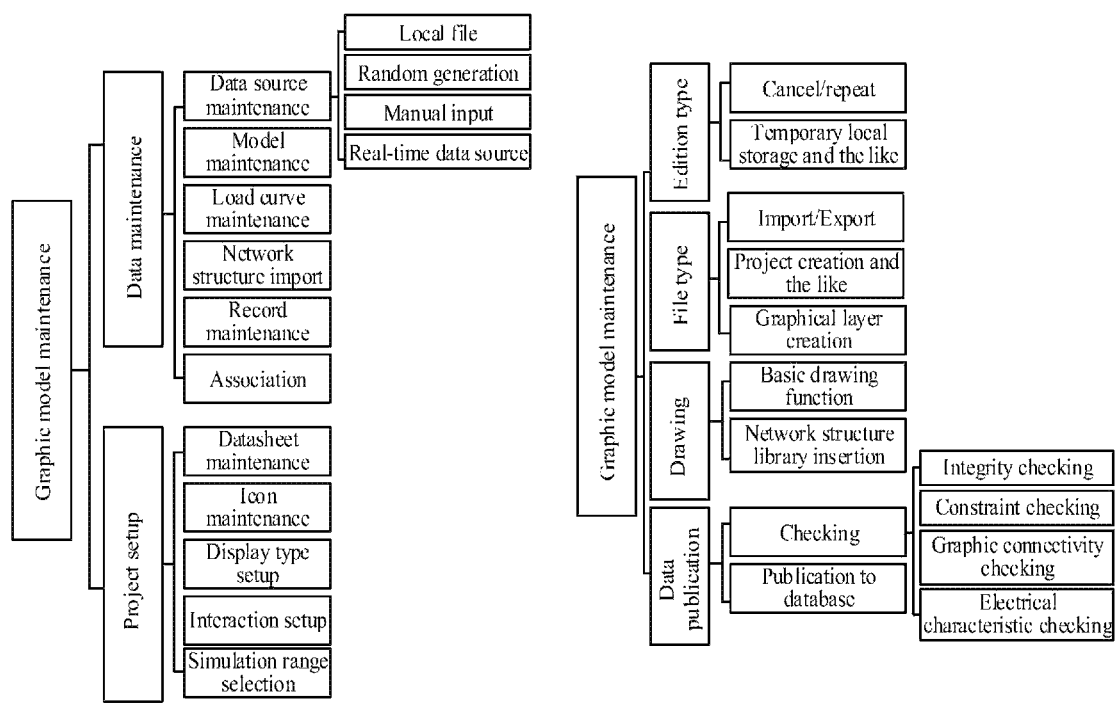
FIG. 3 is a schematic diagram of graphic model maintenance of a digital simulation system for a power distribution network.

As shown in FIG. 3, a graphic model library maintenance unit implements unified maintenance of graphic data and attribute data, implements input of three types of data required to be maintained, i.e. graphics, data and records, and has functions of data maintenance, project setup, edition type setup, file type setup, drawing, data distribution and the like. All geographic map data, graphic data and attribute data are input and maintained through a graphic data maintenance system, and these data include an in-station wiring diagram (including in-transformer-substation and in-multi-loop), an electric system diagram, working condition map data, geographic map data, equipment attribute data, an equipment model table, a Direct-Attached Storage (DAS) operation parameter of an open system and the like.

Figure 4:
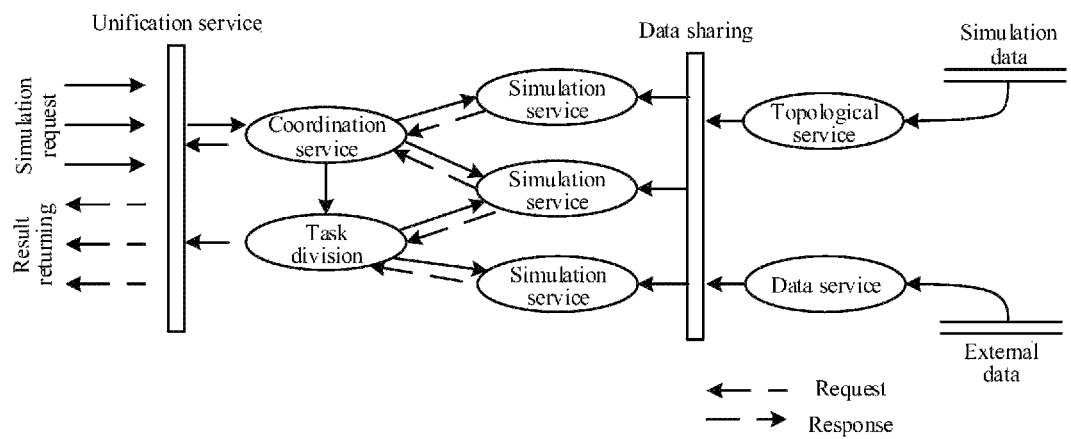
FIG. 4 is a diagram of a data stream at a server of a simulation system.
Figure 5:
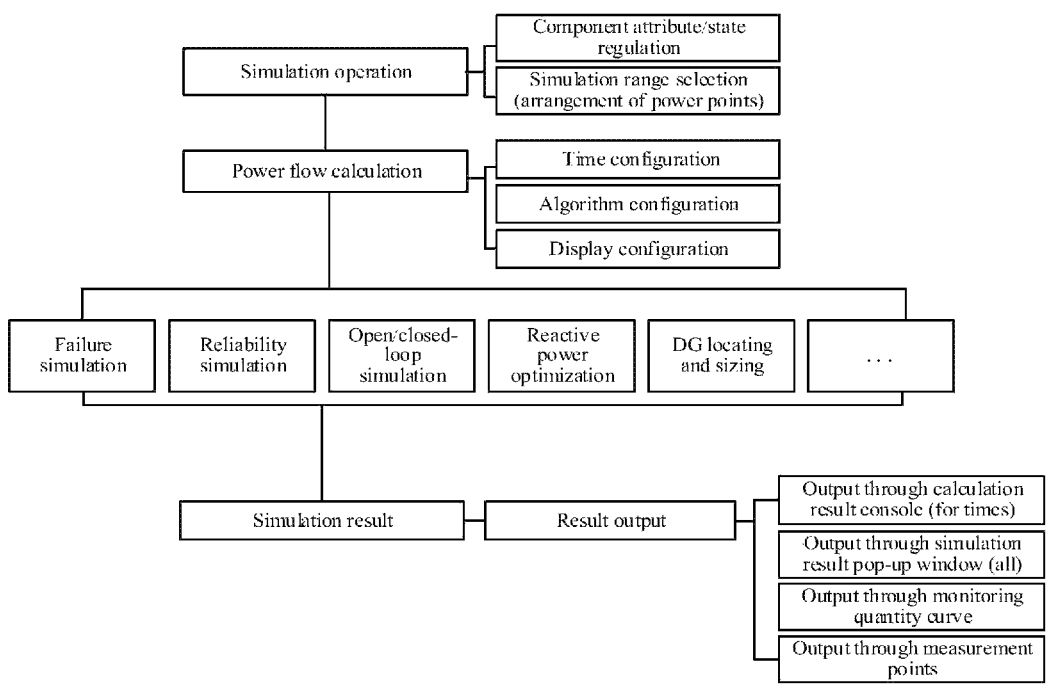
FIG. 5 is a flowchart of digital simulation for a power distribution network.

As shown in FIG. 4 and FIG. 5, that the service layer provides unified calling of the simulation service of the encapsulation layer for the clients includes the following steps.

In (1), a coordination server is selected from the distributed cluster, and the coordination server is configured to give responses to access requests of the clients, maintain a to-be-processed task queue $A=\{a_1, a_2, a_3 \ldots\}$ and allocate simulation tasks by adopting a dynamic polling method.

In (2), a target network in a task queue of the simulation database is read for unified topology and sharing to each simulation server; meanwhile, the coordination server is used to continuously monitor and continuously update each server; each simulation server is analyzed in real time to allocate the simulation tasks into the cluster; and when a total number of network nodes for a certain task exceeds a threshold value, Step (3) is executed, when a total number of network nodes for a certain task does not exceed a threshold value Step (4) is executed.

In (3), the simulation task in a complex network scale and involving multiple nodes is divided and distributed to idle simulation servers, meanwhile, a coordinated communication process is maintained, and an intermediate value of the nodes is integrated to generate a simulation result. The following points should further be noted for division of the simulation task.

1) Calculation is performed independently for each subnetwork without influence to avoid serial execution. After division, large-scale system high-dimensional algorithm solving is avoided, and certain calculation benefits are achieved.

2) Data of the subnetworks is relatively private, only a small amount of coordination information is required to be exchanged, and network congestion caused by massive communication is avoided as much as possible.

In (4), simulation calculation is ended, and the simulation result is returned.

The operation that the simulation tasks are allocated by adopting the dynamic polling method in Step (1) includes the following steps.

In a), N simulation nodes are polled, real-time performance and current task load of each node are acquired, and current task load time is estimated to be $t_i$ (i<N), N being an integer greater than or equal to 1.

In b), the estimated current task time $T=\{t_1, t_2, t_3 \ldots\}$ and performance coefficients $\partial=\{\partial_1, \partial_2, \partial_3 \ldots\}$ of all the nodes are calculated, and a to-be-allocated task node set $Re=f_{min}(T \times \partial, m)$ is acquired, where $f_{min}(S, m)$ represent m values, which are lower than all other values, of a set S.

In c), m tasks are allocated according to the set Re, and the to-be-processed task queue is updated.

Those skilled in the art should know that: if being implemented in form of software function module and sold or used as an independent product, the integrated unit of the disclosure may also be stored in a computer-readable storage medium. Based on such an understanding, the technical solution of the embodiment of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method of each embodiment of the disclosure. The storage medium includes: various media, such as mobile storage equipment, a Random Access Memory (RAM), a Read-Only Memory (ROM), a magnetic disk or an optical disk, capable of storing program codes.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure is defined by the scope of protection of the claims.

The invention claimed is:

1. A digital simulation system for a power distribution network, comprising:
   clients and a server, wherein
   the server comprises a simulation server cluster formed by simulation servers;
   the clients are configured to be connected with the simulation server cluster through a communication bus; and
   the server is configured to:
   operate information off line within a unit time, estimate a state of the power distribution network, simulate an operation state of the unit time off line, acquire each of operation indexes, comprising a power flow distribution, a voltage, reactive power and line loss,
   operate the information in real time within the unit time, estimate the state of the power distribution network, simulate the operation state of the unit time on line, acquire each of operation indexes,
   calculate a short-circuit current of the power distribution network,
   calculate a reliability level, trend simulation, contingency simulation and reliability simulation of the power distribution network according to a structure and equipment information of the power distribution network, acquire failure reliability, a system average power outage frequency and a power outage duration,
   calculate a capacitor capacity and position of a reactive power compensation device, provide a wiring solution meeting loads of the power distribution network, and implement unified maintenance of graphic data and attribute data;
   the server comprises a data layer, an encapsulation layer and a service layer, wherein the data layer is configured to extract simulation data from a simulation database and an external data source; the encapsulation layer is configured to encapsulate a simulation module of the service layer into a simulation service; and the service layer is configured to provide for unified calling of the simulation service of the encapsulation layer for the clients;
   the service layer is further configured to:
   select a coordination server from the simulation server cluster, and configure the coordination server to give responses to access requests of the clients, maintain a to-be-processed task queue and allocate simulation tasks by adopting a dynamic polling method;
   read a unified topology of the power distribution network from the task queue of the database and provide for sharing with each simulation server;
   use the coordination server to continuously monitor and continuously update each simulation server;
   analyze each simulation server in real time to allocate the simulation tasks to the simulation servers;
   when a total number of the power distribution network nodes for a certain task exceeds a threshold value, divide the simulation task based on the complexity of the power distribution network and total number of the power distribution network nodes and distribute the divided simulation task to idle simulation servers;
   maintain a coordinated communication process with each simulation server; and
   integrate an intermediate values of the power distribution network nodes generated by each simulation server to generate a simulation result of the power distribution network;
   when a total number of the power distribution network nodes for a certain task does not exceed the threshold value end simulation calculation, and return the simulation result;
   the service layer is further configured to:
   poll N simulation servers, N being an integer greater than or equal to 1;
   acquire real-time performance and current task load of each simulation server;
   estimate current task load time to be $t_i$ (i<N);
   calculate estimated current task execution time $T=\{t_1, t_2, t_3 K\}$,
   where $t_1$ represents estimated time to perform the current task that is distributed to the $1^{st}$ simulation server, $t_2$ represents estimated time to perform the current task that is distributed to the $2^{nd}$ simulation server, and $t_3$ represents estimated time to perform the current task that is distributed to the 3rd simulation server, and
   calculate performance coefficients $\partial=\{\partial_1, \partial_2, \partial_3 K\}$ of all the simulation servers,
   where $\partial_1$ represents the computing efficiency of the $1^{st}$ simulation server, $\partial_2$ represents the computing efficiency of the $2^{nd}$ simulation server, $\partial_3$ represents the computing efficiency of the $3^{rd}$ simulation server;
   acquire a to-be-allocated simulation task set $Re=f_{min}(T\times\partial, m)$,
   where Re represents the set of all possible solutions for distributing m simulation tasks to N simulation servers, $f_{min}$ represents the minimum value of estimated computing time for performing all simulation tasks by all simulation servers,
   m represents the number of simulation tasks, and
   $f_{min}(S, m)$ represents m values, which are lower than all other values for a set S,
   S represents a solution of distribution of simulation tasks to simulation servers while the estimated computing time for performing all simulation tasks is minimum;
   allocate m tasks according to the set S; and
   update the to-be-processed task queue.

2. The digital simulation system for the power distribution network according to claim 1, wherein
   the clients are further configured to use a Distributed Component Object Model (DCOM) component to call simulation service provided by the server; and
   the server is configured to distribute to-be-processed tasks to each node of the simulation server cluster.

3. The digital simulation system for the power distribution network according to claim 2, wherein the simulation server cluster is connected with the simulation database and the external data source through double data buses respectively.

4. The digital simulation system for the power distribution network according to claim 1, wherein the simulation server cluster is connected with the simulation database and the external data source through double data buses respectively.

5. The digital simulation system for the power distribution network according to claim 1, wherein the encapsulation layer is configured to:
   load the simulation data into a shared memory of the simulation server cluster;
   call the DCOM component of a memory database for memory calculation;
   transmit Extensible Markup Language (XML)-format data;
   parse XML files sent by the clients; and
   screen received data to filter an illegal request through a simulation interface.

6. The digital simulation system for the power distribution network according to claim 1, wherein the service layer is configured to:
   operate the information off line within the unit time, estimate the state of the power distribution network, simulate the operation state of the unit time off line, and acquire each of operation indexes, comprising the power flow distribution, the voltage, the reactive power and the line loss;
   operate the information in real time within the unit time, estimate the state of the power distribution network, simulate the operation state of the unit time on line, and acquire each of operation indexes;
   calculate the short-circuit current of the power distribution network;
   calculate the reliability level, trend simulation, contingency simulation and N-K reliability simulation of the power distribution network according to the structure and equipment information of the power distribution network, and acquire the failure reliability, the system average power outage frequency and the power outage duration;
   calculate the capacitor capacity and position of the reactive power compensation device and the locating and provide the wiring solution meeting the loads of the power distribution network; and
   implement unified maintenance of the graphic data and the attribute data.

7. The digital simulation system for the power distribution network according to claim 1, wherein the simulation server cluster is connected with the simulation database and the external data source through double data buses respectively.

* * * * *